US006755533B2

(12) United States Patent
Fraser et al.

(10) Patent No.: US 6,755,533 B2
(45) Date of Patent: Jun. 29, 2004

(54) MOVEABLE DISPLAY DEVICE FOR THREE DIMENSIONAL IMAGE CREATION

(75) Inventors: Sherridythe A. Fraser, San Jose, CA (US); William Robert Hanson, Mountain View, CA (US)

(73) Assignee: Palm, Inc., Santa Clara, CA (US)

( * ) Notice: Subject to any disclaimer, the term of this patent is extended or adjusted under 35 U.S.C. 154(b) by 392 days.

(21) Appl. No.: 09/997,383

(22) Filed: Nov. 29, 2001

(65) Prior Publication Data

US 2003/0098832 A1 May 29, 2003

(51) Int. Cl.$^7$ .......................... G03B 21/00; G02B 27/22
(52) U.S. Cl. ......................................... 353/10; 359/478
(58) Field of Search ............................. 353/7–9, 11, 22, 353/28, 122, 10; 348/51–60; 359/22–26, 466–469, 472, 477, 478; 349/15, 16

(56) References Cited

U.S. PATENT DOCUMENTS

| | | | |
|---|---|---|---|
| 907,973 A | * 12/1908 | Crocker et al. ............. 359/472 |
| 2,145,423 A | * 1/1939 | Long .......................... 359/467 |
| 4,306,768 A | 12/1981 | Egging |
| 4,398,723 A | 8/1983 | Erickson et al. |
| 4,736,214 A | 4/1988 | Rogers |
| 5,418,579 A | 5/1995 | Jamieson et al. |
| 5,585,967 A | 12/1996 | Monroe |
| 5,600,402 A | 2/1997 | Kainen |
| 5,669,685 A | 9/1997 | Kotani et al. |
| 5,782,547 A | 7/1998 | Machtig et al. |
| 5,954,414 A | * 9/1999 | Tsao .............................. 353/7 |
| 6,023,263 A | 2/2000 | Wood |
| 6,115,101 A | 9/2000 | Kainen |
| 6,252,624 B1 | * 6/2001 | Yuasa et al. .................. 348/56 |
| 6,510,002 B1 | * 1/2003 | Tsang ........................ 359/465 |
| 2001/0012054 A1 | * 8/2001 | Sudo ........................... 348/51 |

OTHER PUBLICATIONS

Miceli, Gene A., *Display Technologies*, pp. 1–11, printed from the Internet web site: http://seminars.seyboldreports.com/seminars/20001_boston/47/GeneMiceli.ppt (including a chart with a date of Feb. 27, 2001).

E Ink, *What is Electronic Ink?*, pp. 1–2, printed from the Internet web site: http://www.eink.com/technology/index.htm on Oct. 10, 2001.
*Electronic Reusable Paper*, pp. 1–2, printed from the Internet web site: http://www.parc.xerox.com/dhl/projects/gyricon/ on Oct. 10, 2001.
Actualdepth Technology, *Technology*, pp 1–2, printed from the Internet web site: http://www.actualdepth.com/default.cfm?flashAvailable=true on Oct. 19, 2001.
Actualdepth Technology,*Products*, pp. 1–3, printed from the Internet web site: http://www.actualdepth.com/default.cfm?pageID=7 on Oct. 19, 2001.
Actualdepth Technology, *Case Studies*, pp. 1–2, printed from the Internet web site: http://www.actualdepth.com/default.cfm?pageID=179 on Oct. 19, 2001.
Deep Video Imaging—*Next Generation Display Technology*, pp. 1–2, printed from the Internet web site: http://www.actualdepth.com/default.cfm?pageID=49&81F23802–C1 . . . on Oct. 19, 2001.

* cited by examiner

*Primary Examiner*—Russ Adams
*Assistant Examiner*—Andrew Sever
(74) *Attorney, Agent, or Firm*—Foley & Lardner LLP

(57) ABSTRACT

A display system is disclosed. The display system includes a processor and a first display device having a first display surface and receiving display data from the processor. The display system also includes a second display device having a display area smaller than the first display device and moveable over the surface of the first display device. The second display device is either partially transparent or partially translucent. The display system also includes a sensor in communication with the processor and communicating location data to the processor. The location data is representative of the relative location of the first display to the second display. A program is configured to run on the processor and provides display data to the first and second display devices such that the display data prior to the second display device is based on the location data. A user of the system views a composite three-dimensional image when viewing the second display. The composite three-dimensional image is made up of a partial first image from the first display viewed through the second display and a partial second image from the second display.

22 Claims, 3 Drawing Sheets

MOVEABLE DISPLAY DEVICE FOR THREE DIMENSIONAL IMAGE CREATION

BACKGROUND

The present invention relates generally to the field of imaging devices. In particular, the invention relates to multi-planar or three-dimensional imaging devices. Further, the invention relates to apparatuses and methods for providing images having a three-dimensional effect using moveable overlapping planar imaging devices.

Liquid crystal display monitors have conventionally been used to produce three-dimensional images and images with a three-dimensional or multi-planar effect. For example, monitors such as ActualDepth LCD monitors available from Deep Video Imaging Limited of Hamilton, New Zealand utilize multiple LCD monitor layers which provide two physically separate image planes to provide a composite or merged three-dimensional image or three-dimensional effect image. Such imaging devices have been incorporated into a single monitor. However, such three-dimensional imaging devices require a substantial amount of processing power and electrical power in order to continually process the multi-planar images over the entire display screen on an ongoing or continuous basis. For low power, low cost, and/or portable or mobile devices, a need for substantial electrical power and substantial processing power is undesirable.

Accordingly, there is a need for non-conventional three-dimensional imaging devices that are not encumbered by the disadvantages associated with devices of the prior art. There is also a need for a large planar display device that is capable of displaying a two-dimensional image on a first planar surface and allowing three-dimensional imaging on a second display device, the second display device being smaller than the first display device and being moveable over the first display device.

It would therefore be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the above-mentioned needs.

SUMMARY

An exemplary embodiment relates to a display system. The display system includes a processor. The display system also includes a first display device having a first display surface and receiving display data from the processor. The display system further includes a second display device having a display area smaller than the first display device and moveable over the surface of the first display device. The second display device is at least one of partially transparent and partially translucent. Further still, the display system includes a sensor in communication with the processor and communicating location data to the processor. The location data is representative of the relative location of the first display to the second display. Yet further still, the display system includes a program running on the processor and providing display data to the first and second display devices. The display data is provided to the second display device and is based on the location data. A user of the display system uses a composite three-dimensional image when viewing the second display. The composite three-dimensional image is made up of a partial first image from the first display viewed through the second display and a partial second image from the second display.

Another exemplary embodiment relates to a method of providing a first image to a display system user. The method includes providing an image on a first display. The method also includes detecting the location of a second display relative to the first display. Further, the method includes providing display data to the second display based on the detected location of the second display. Further still, the method includes merging the image from the first display through the second display, with a second image generated from the display data on the second display to create a three-dimensional image.

Further, an exemplary embodiment relates to a moveable display device configured for movement across a primary display surface, the primary display being in communication with a processing device. The moveable display device includes an at least partially-transparent display screen. The display screen includes electronically selectable pixelated display elements. The moveable display device also includes a wireless communications device receiving display data from the processing device. The display data is based on location data from a location sensor sensing the relative location of the moveable device and the primary display surface. The moveable display device generates a partial image based on the display data. A viewer of the second display device views a composite three-dimensional image generated from a partial image on the primary display and from the partial image on the moveable display device.

Alternative exemplary embodiments relate to other features and combination of features as may be generally recited in the claims.

BRIEF DESCRIPTION OF THE DRAWINGS

The invention will become fully understood from the following detailed description, taken in conjunction with the accompanying drawings, wherein like reference numerals refer to like elements, in which.

DETAILED DESCRIPTION OF EXEMPLARY EMBODIMENTS

A moveable secondary imaging device is described below. The moveable secondary imaging device is capable of generating a three-dimensional image as viewed by an observer. When referring to a three-dimensional image, it is contemplated that a variety of types of three-dimensional images may be generated by the secondary imaging device, including, but not limited to, a three-dimensional graphics image, a vectorized three-dimensional image, a ray-traced three-dimensional image, an image having a three-dimensional effect, a multi-planar image, a holographic image, and the like. Accordingly, the term "three-dimensional image" is intended to encompass any of the types of images which provide depth beyond a two-dimensional or conventional flat-screen image.

Figure 1:
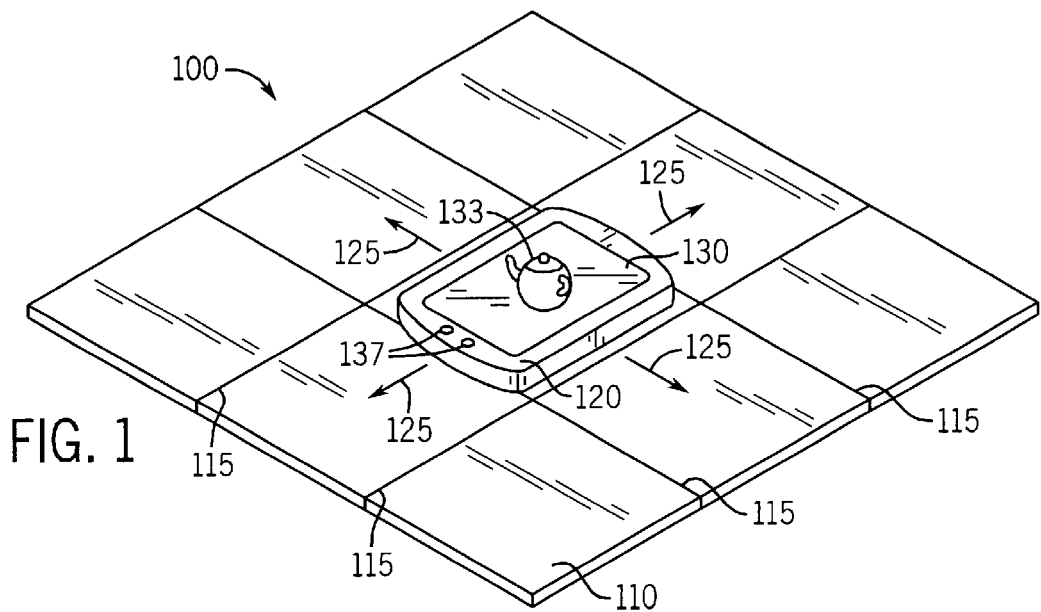
FIG. 1 is a generalized diagram of a moveable display device providing a three-dimensional image in combination with a larger display screen.

Referring now to FIG. 1, a display system 100 is depicted. Display system 100 includes a flat-screen display 110 having a relatively large display area. Display 110 may be any of a variety of electronic display devices, including, but not limited to, cathode ray tube (CRT) devices, liquid crystal display (LCD) devices, thin film transistor (TFT) devices, active matrix devices, organic light emitting diode (OLED) devices, organic electroluminescent (OEL) devices, electronic paper devices (such as elnk, Smart Paper™ by Gyricon Media, APD™ by Citala, etc.), and the like. As depicted as an exemplary embodiment in FIG. 1, display 110 may be a foldable display or flexible display, as indicated by fold lines 115. Images displayed on display 110 are driven by a processing device 410 depicted in FIG. 4. In a particularly preferred embodiment, display 110 may be a foldable display that is detachable from a processing unit such as processing unit 410. Also, processing unit 410 may be, but it not limited to, a portable electronic device such as a handheld computer. Display 110 is configured to provide an image or images across substantially the entire planar surface of display 110 providing a relatively large display area. A secondary display unit 120 is moveable over display 110 in any of a variety of directions indicated by directional arrows 125. Accordingly, secondary display device 120 may be moved to any position on display 110. In a particularly preferred embodiment, secondary display device 120 includes a display surface and/or display window 130. Display window 130 may be any of a variety of display devices, such as, but not limited to, an LCD device, or any of a variety of other devices in which pixels of the image may be manipulated by electronic means in one surface of the device and light may be transmitted through window 130 to and from display 110.

In an exemplary embodiment, images may be provided on display 110. A user, desiring to view an image on display 110 in three-dimensional (3-D) form, would move secondary display 120 over the particular image or image area of which a user desires the 3-D image. Secondary display device 120 includes a location sensor 135 (see FIG. 4) which provides a relative location signal to processing unit 410. The relative location signal is representative of the relative location of secondary display device 120 on display 110. The relative location signal sent to processing unit 410 may also include an orientation signal which provides the relative orientation of display device 120 on display 110.

When processing unit 410 receives the location signal, processing unit 410 is then aware of the image on display 110 that is being covered by window 130. Given the information that window 130 is covering a specific image or portion of display 110, processing unit 410 is configured via computer software to generate a complementary image to be displayed in window 130. To the eye of an observer looking through window 130, the merging of a first image under window 130 on display 110 and a second image in display window 130 generates a three-dimensional image 133 which may be viewed by an observer looking through window 130. Data which is used to generate the image in window 130 is communicated to device 120 by any of a variety of means including, but not limited to, a wireless radio frequency link between device 120 and processing unit 410 via transceiver 136 in device 120 and a transceiver 420 in processing unit 410.

Figure 2:
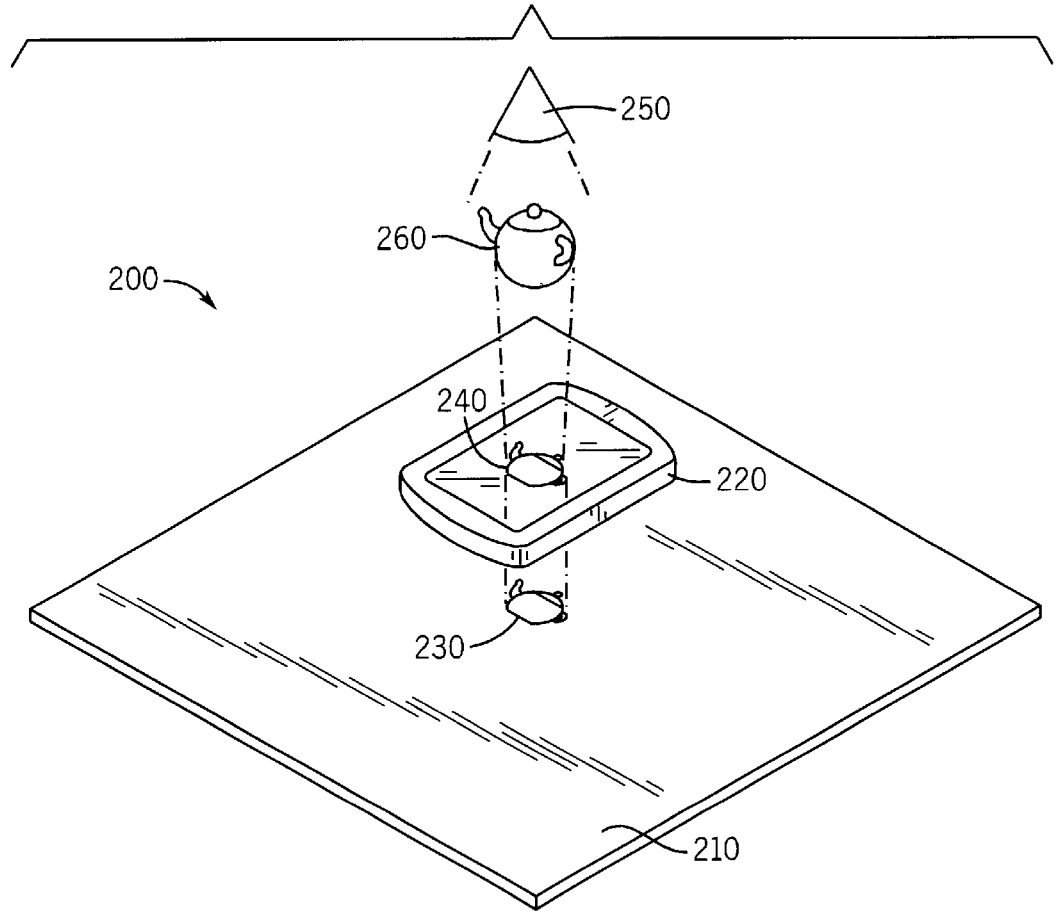
FIG. 2 is a generalized depiction of a large first display device having a first image thereon and a second display device providing a second image thereon to produce a third three-dimensional image to a viewer.

By further illustrative example, a display system 200 is depicted in FIG. 2. Display system 200 includes a large display surface 210 and a moveable display surface 220. A first image 230 is generated on display 210 when device 220 is located directly over image 230, a processing unit, such as processing unit 410 of FIG. 4 receives a location signal from device 220 to indicate the precise location of device 220. A second image 240 is then generated and communicated to be displayed on device 220. First image 230 and second image 240 are merged by the eye of an observer 250 to construct a virtual three-dimensional image 260. Thus, planar images 230 and 240 are merged to form what appears to observer 250 to be a three-dimensional image 260. Generating second image 240 may, however, require an abundance of processing power. Accordingly, it is beneficial to generate image 240 for only an area as big as display surface 220 and not for an entire display screen 210. Accordingly, device 220 may be moved about display screen 210 in order to visualize any areas of display 210 which may be desired to be seen in three dimensions.

Referring back to FIG. 1, in an exemplary embodiment, a set of buttons or other input devices 137 may be utilized on device 120 to provide input to device 120. Buttons 137 may be used to zoom in and out of the windowed area 130, causing an enlargement or shrinkage of three-dimensional image 133. Further, buttons 137 may also be used to provide an orientation signal such that image 133 may be rotated and/or the orientation of image 133 may be affected. Further, buttons 137 may be used for a variety of other functions relating to manipulation of the 3-D image.

Figure 3:
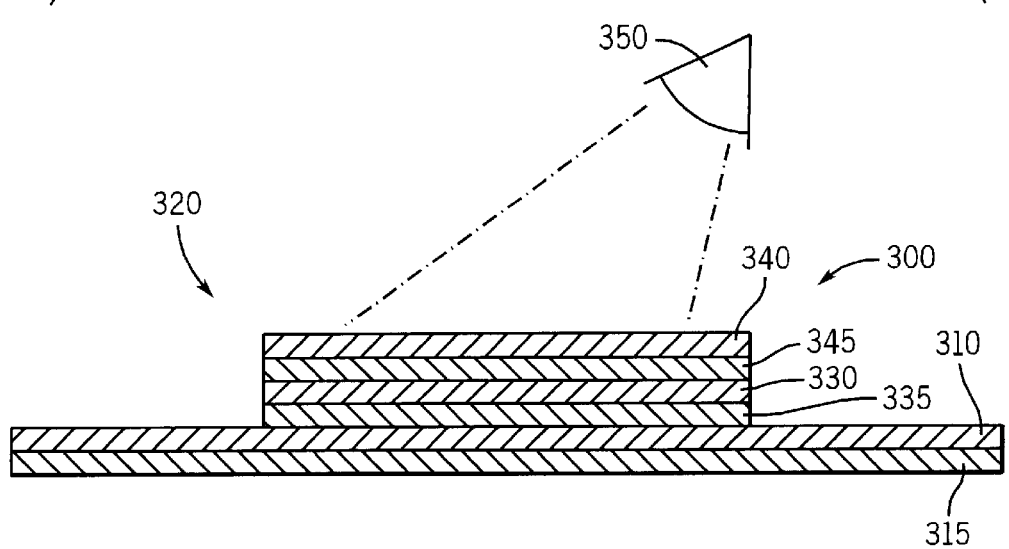
FIG. 3 is a side view of a multi-planar moveable display device moveable over a larger display device.

Referring now to FIG. 3, a display system 300 is depicted. Display system 300 includes a larger display surface 310. Larger display surface 310 includes a support structure 315. A secondary moveable display device 320 is shown disposed on surface 310. In the exemplary embodiment depicted in FIG. 3, display device 320 includes two display layers including a first display layer 330 and a second display layer 340. Display layer 330 is supported by a support structure 335 which may be provided around the perimeter of display 330 or alternatively may be supporting display layer 330 but remain transparent to images coming from display surface 310. Display layer 340 is supported over display layer 330 by a support structure 345. Support structure 345 may be a support structure disposed around the perimeter of display layer 340 or alternatively may be a transparent support structure such that images from surface 310 and display layer 330 may be seen through display layer 340 by the eye of an observer 350. Device 320 may have any of a variety of numbers of layers including, but not limited to, a single layer, or multiple layers.

Figure 4:
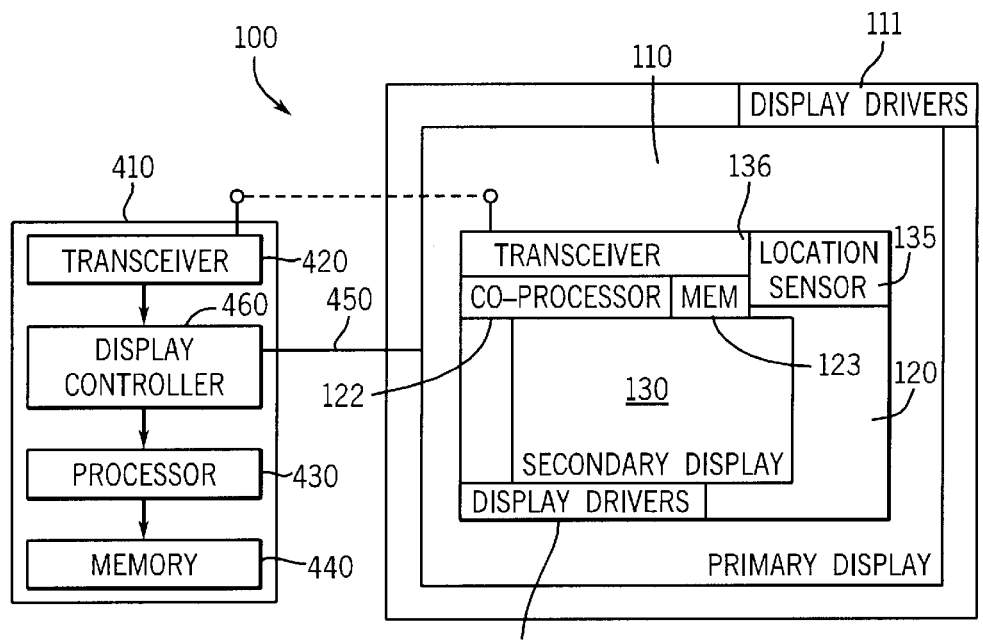
FIG. 4 is a block diagram of a primary display device including electronics generating an image and a wireless secondary display device moveable over the primary display device.

Referring now to FIG. 4, a block diagram of system 100 is depicted in FIG. 4. As discussed earlier primary display 110 may be a large area display having disposed upon its surface a secondary display 120 having a display window 130 and further including a location sensor 135 and transceiver 136. Transceiver 136 is configured to communicate data between processing unit 410 via transceiver 420. Processing unit 410 includes a processor 430 coupled to a memory 440. Processor 430 is also coupled to a display controller 460 which may control both displays 110 and 120 which use display drivers 111 and 121 respectively. Communications to primary display 110 may be provided through a signal bus 450 or other communications connections. Further, primary display 110 may be communicated with via transceiver 420. In a particular exemplary embodiment, display 120 may include its own co-processor 122 and memory 123.

Figure 5:
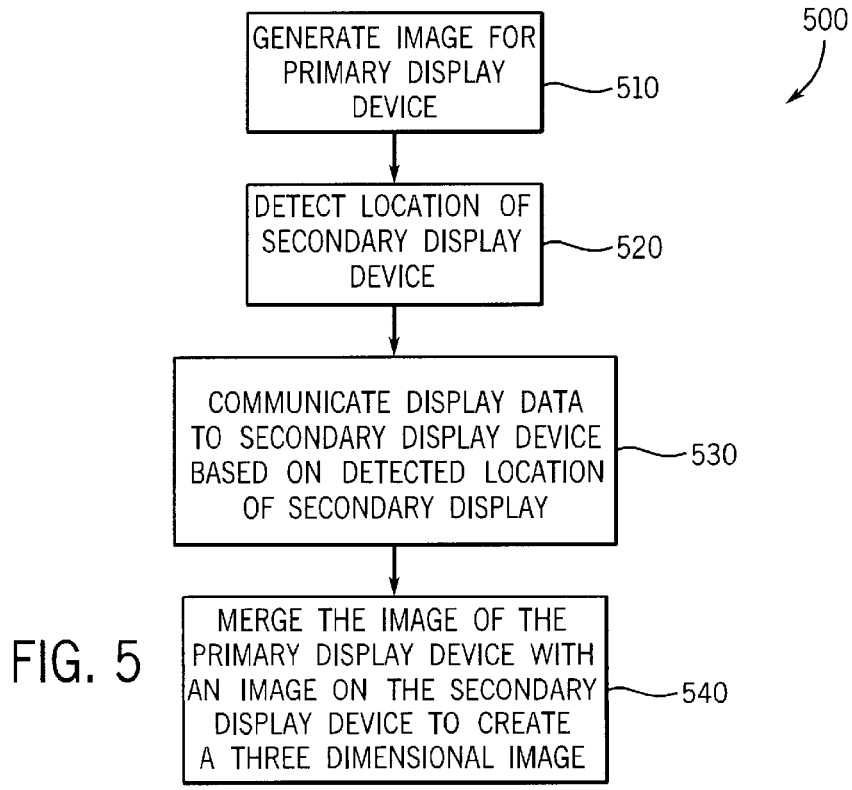
FIG. 5 is a process diagram of steps relating to the generation of a three-dimensional image using a moveable secondary imaging device.

Referring now to FIG. 5, a process 500 is depicted. Process 500 utilizes the apparatuses described above and depicted in FIGS. 1–4. An image is generated on primary display device 110 (step 510). A user moves secondary display device 120 to an appropriate position and activates the device. The location of secondary display device 120 is then detected by sensors on either primary display 110 or on secondary display device 120 or any combination thereof (step 520). After the location of secondary display device 120 has been established and communicated to processing unit 410, processing unit 410 generates display data that is communicated to secondary display device 120 and is based on the detected location of secondary display device 120 (step 530). Secondary display device 120 then displays a second image on window 130 and the second image is merged with the first image from display 110 to form a three-dimensional or virtual three-dimensional image (step 540).

In an further exemplary embodiment, secondary display device 120 may be a passive display device in which a three-dimensional image is created by passing window 130 over images on display screen 110. Window 130 thus acts as a light filter to produce a three-dimensional effect from the images created on display screen 110 without requiring communication of the location of secondary display 120 or without requiring display data communications from processing unit 410 to display device 120.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A display system, comprising:

a processor;

a first display device having a first display surface and receiving display data from the processor;

a second display device having a display area smaller than the first display device and moveable over the surface of the first display device, the second display device being at least one of partially transparent and partially translucent; and a sensor in communication with the processor and communicating location data to the processor, the location data being representative of the relative location of the first display to the second display; and a program running on the processor and providing display data to the first and second display devices, such that the display data provided to the second display device is based on the location data, wherein a user of the system views a composite three dimensional image when viewing the second display, the composite three dimensional image made up of a partial first image from the first display viewed through the second display and a partial second image from the second display.

2. The display system of claim 1, wherein the first display device includes a flexible display.

3. The display system of claim 2, wherein the first display device includes an e-paper display.

4. The display system of claim 1, wherein the first display includes a liquid crystal display.

5. The display system of claim 1, wherein the second display includes a liquid crystal display.

6. The display system of claim 1, wherein the sensor is a capacitive sensor.

7. The display system of claim 1, wherein the sensor is an optical sensor.

8. The display system of claim 1, wherein the three dimensional image is a holographic image.

9. The display system of claim 1, wherein the second display includes more than one display layer.

10. The display system of claim 1, wherein the three dimensional image includes images which appear to be located behind other images.

11. The display system of claim 1, wherein the sensor includes a touch sensor.

12. A method of providing an image to a display system user, comprising:

providing a first image on a first display;

detecting the location of a second display relative to the first display;

providing display data to the second display based on the detected location of the second display;

merging the image from the first display through the second display, with a second image generated from the display data on the second display to create a three dimensional image.

13. The method of claim 12, further comprising:

transmitting data representative of the detected location of the second display to a processing device.

14. The method of claim 12, further comprising:
transmitting second display data from the processing device to the second display device.

15. A moveable display device configured for movement across a primary display surface, the primary display being in communication with a processing device, comprising:
- an at least partially transparent display screen, the display screen including electronically selectable pixelated display elements; and
- a wireless communications device receiving display data from the processing device, the display data being based on location data from a location sensor sensing the relative location of the display device and the primary display surface, the moveable display device generating a partial image based on the display data,
- wherein a viewer of the second display device views a composite three dimensional image generated from a partial image on the primary display and from the partial image on the moveable display device.

16. The moveable display device of claim 15, wherein the display screen includes a liquid crystal display.

17. The moveable display device of claim 15, wherein the location sensor includes a capacitive sensor.

18. The moveable display device of claim 15, wherein the sensor includes an optical sensor.

19. The moveable display device of claim 15, wherein the location sensor includes a touch sensor.

20. The moveable display device of claim 15, wherein the three dimensional image is a holographic image.

21. The moveable display device of claim 15, wherein the second display includes more than one display layer.

22. The moveable display device of claim 15, wherein the three dimensional image includes images which appear to be located behind other images.

* * * * *